United States Patent
Whitmire et al.

(10) Patent No.: US 10,838,492 B1
(45) Date of Patent: Nov. 17, 2020

(54) GAZE TRACKING SYSTEM FOR USE IN HEAD MOUNTED DISPLAYS

(71) Applicant: NVIDIA Corp., Santa Clara, CA (US)

(72) Inventors: Eric Whitmire, Seattle, WA (US);
Kaan Aksit, San Jose, CA (US);
Michael Stengel, Cupertino, CA (US);
Jan Kautz, Lexington, MA (US);
David Luebke, Charlottesville, VA (US); Ben Boudaoud, Efland, NC (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/578,023

(22) Filed: Sep. 20, 2019

(51) Int. Cl.
*G06F 3/01* (2006.01)
*G06K 9/00* (2006.01)
*G06F 3/03* (2006.01)
*G02B 27/00* (2006.01)

(52) U.S. Cl.
CPC ......... *G06F 3/013* (2013.01); *G02B 27/0093* (2013.01); *G06F 3/0325* (2013.01); *G06K 9/00604* (2013.01)

(58) Field of Classification Search
CPC ..... A63F 13/00; A63F 13/25; G02B 27/0093; G02B 27/017; G02B 27/0172; G02B 30/26; G02B 30/52; G02B 2027/0134; G02B 2027/0138; G02B 2027/014; G02B 2027/0178; G02B 2027/0187; G06F 3/011; G06F 3/012; G06F 3/013; G06F 3/014; G06F 3/016; G06F 3/017; G06F 3/0304; G06F 3/0346; G06F 3/0482; G06K 9/00268; G06K 9/00671; G06K 9/00389; G06K 9/4642; G06K 9/4652; G10L 19/00; H04N 13/117; H04N 13/139; H04N 13/189; H04N 13/204; H04N 13/239; H04N 13/271; H04N 13/279; H04N 13/344; H04N 13/366; H04N 13/383; H04N 21/414; H04N 13/371; H04N 2013/0081; H04N 7/185
See application file for complete search history.

(56) References Cited

U.S. PATENT DOCUMENTS

| | | | |
|---|---|---|---|
| 4,829,321 | A | 5/1989 | Iizuka et al. |
| 4,904,862 | A | 2/1990 | Bertagne |
| 6,265,984 | B1 | 7/2001 | Molinaroli |
| 2003/0122749 | A1 | 7/2003 | Booth et al. |
| 2006/0039143 | A1 | 2/2006 | Katoh et al. |
| 2009/0213585 | A1 | 8/2009 | Chern et al. |
| 2009/0295683 | A1 | 12/2009 | Pugh et al. |
| 2011/0075418 | A1 | 3/2011 | Mallory et al. |

(Continued)

OTHER PUBLICATIONS

Dmytro Katrychuk et al., Power-Efficient and Shift-Robust Eye-Tracking Sensor for Portable VR Headsets, ETRA '19, June 25-28, 2019, Denver, CO, USA.

(Continued)

*Primary Examiner* — Nelson M Rosario
(74) *Attorney, Agent, or Firm* — Rowan TELS LLC

(57) ABSTRACT

A gaze tracking system for use in head mounted displays includes an eyepiece having an opaque frame circumferentially enclosing a transparent field of view, light emitting diodes coupled to the opaque frame for emitting infrared light onto various regions of an eye gazing through the transparent field of view, and diodes for sensing intensity of infrared light reflected off of various regions of the eye.

16 Claims, 12 Drawing Sheets

(56) References Cited

U.S. PATENT DOCUMENTS

| | | |
|---|---|---|
| 2011/0305014 A1 | 12/2011 | Peck |
| 2016/0003442 A1* | 1/2016 | Kim et al. |
| 2019/0094981 A1* | 3/2019 | Bradski .............. G02B 27/0093 |
| 2019/0138094 A1* | 5/2019 | Miettinen .......... G06K 9/00604 |
| 2019/0236355 A1* | 8/2019 | Ollila ..................... G06F 3/013 |

OTHER PUBLICATIONS

Tianxing Li et al., Battery-Free Eye Tracker on Glasses, Mobicom'18, Oct. 29-Nov. 2, 2018, New Delhi, India.

Tianxing Li et al., Ultra-Low Power Gaze Tracking for Virtual Reality, Sensys'17 Nov. 6-8, 2017, Delft, Netherlands.

Ioannis Rigas et al., Hybrid PS-V Technique: A Novel Sensor Fusion Approach for Fast Mobile Eye-Tracking With Sensor-Shift Aware Correction, IEEE Sensors Joural, vol. 17, No. 24, Dec. 15, 2017.

Ioannis Rigas et al., Photosensor Oculography: Survey and Parametric Analysis of Designs Using Model-Based Simulation.

Raimondas Zemblys et al., Making Stand-Alone PS-OG Technology Tolerant to the Equipment Shifts, Petmei'18 Jun. 14-17, 2018, Warsaw, Poland.

Raimondas Zemblys et al., Developing Photo-Sensor Oculography (PS-OG) System for Virtual Reality Headsets, ETRA'18, Jun. 14-17, 2018, Warsaw, Poland.

* cited by examiner

GAZE TRACKING SYSTEM FOR USE IN HEAD MOUNTED DISPLAYS

BACKGROUND

Head mounted displays (HMDs) use a variety of sensors to provide immersive interaction with engaging virtual reality experiences. Emerging consumer head mounted displays for virtual reality use a variety of different sensing components—embedded in the headset or grouped into an external unit—including but not limited to gyroscopes, accelerometers, and various optical sensors such as cameras, photodiodes, and/or light emitting diodes (LED). These sensors can detect when the device is being worn by a user and track head orientation, user motions, gaze direction and duration, and other factors used to provide visual-based user controls and enhance the user's experience in a virtual world. In particular, the use of gaze as an input modality can substantially enhance the user experience in an HMD system. Indeed, whereas decoupled non-mouse input modalities utilized as pointing mechanisms for large displays has proven awkward, gaze-supported target acquisition has been found by users to be fast and natural. Hence the virtual reality (VR) and augmented reality (AR) industries have been moving toward the use of gaze tracking as a key component of future HMD systems.

Although current prototype solutions are presently bulky and expensive, the growing interest toward low-cost gaze trackers is encouraging development that has already yielded some promising results. Nevertheless, major challenges remain for improving conventional gaze tracking hardware and software. For example, typical conventional gaze trackers rely on camera-based imaging techniques which have relatively high-power demands and, as such, may not be truly suitable for low-power mobile solutions. Imaging equipment also requires substantially complex image processing software, effectively adding a costly image processing block to the pipeline. Because conventional gaze trackers work with high-dimensional inputs (that is, high-resolution images), these inputs result in unwanted latency in the capture hardware, communication protocols, and image processing-based gaze estimation pipeline.

BRIEF SUMMARY

Various implementations disclosed herein are directed to gaze tracking systems for use in head mounted displays. More specifically, various implementations disclosed herein are directed to a head mounted display comprising a lens, a display positioned in front of the lens in an optical path, and one or more photosensor elements positioned behind the lens in the optical path. "Photosensor" refers to any device capable of detecting photons. Examples of photosensors include light emitting diodes operating in sensing mode, photodiodes, photoresistors, and other apparatus for detecting photon known in the art.

Various implementations may further comprise one or more light emitting diodes (optionally adaptively configured in illumination or sensing mode, positioned behind the lens in the optical path adjacent to the photosensor elements.

Various implementations disclosed herein are also directed to a system for gaze tracking generally comprising an eyepiece comprising an opaque frame, circumferentially enclosing a transparent field of view, a plurality of light emitting diodes coupled to the opaque frame for emitting infrared light onto an eye gazing through the transparent field of view, and a plurality of photosensor elements coupled to the opaque frame, each sensor element from among the plurality of photosensors operationally coupled to one or more light emitting diode from among the plurality of light emitting diodes, for sensing intensity of infrared light reflected off of the eye.

Also disclosed are various implementations directed to a method for gaze tracking an eye using a gaze tracking device, the method generally comprising (1) determining with calibration logic a set of calibration data corresponding to a first measure of intensities of infrared light reflected by the eye while the eye is gazing at a plurality of calibration points during a first time period, the calibration points corresponding to a plurality of known gaze directions; and (2) comparing, using a gaze tracking logic, an instant gaze direction for the eye during a second time period based on a second measure of intensities of infrared light reflected by the eye to the set of calibration data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
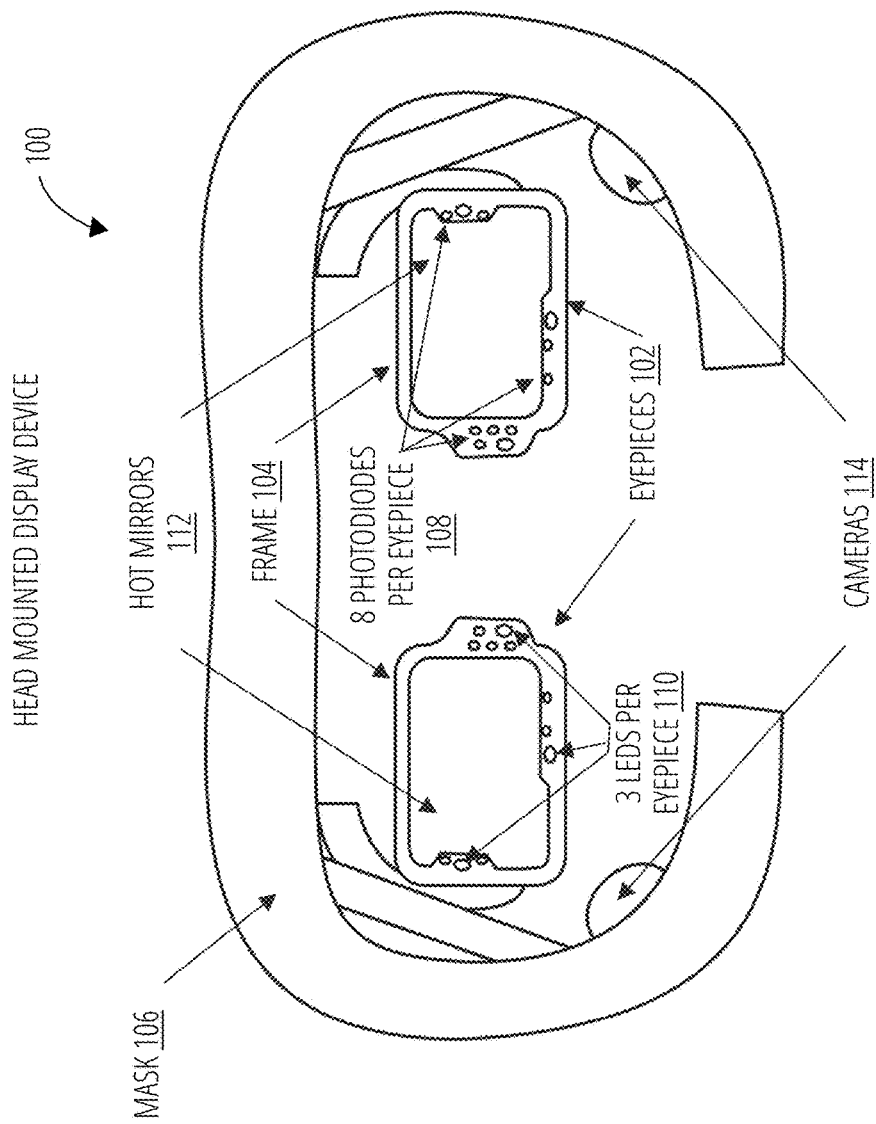
FIG. 1 illustrates an exemplary head mounted display device 100 representative of various implementations disclosed herein.

Today's head mounted display (HMD) manufacturers are competing to create less bulky head mounted displays. This goal may be achieved by reducing the bulk caused by each component of the system. A light emitting diode (LED) may be used as an illuminator or, like a photodiode, as a photosensor for integrating light intensity over a certain field of view and exposure interval. In this manner, LEDs may be used in a gaze tracker both for capture and illumination. Alternatively, purpose-built, single output photosensor elements, such as photodiodes and photoresistors, can be used to sense light over more precisely controlled conditions.

Off-the-shelf photosensor elements are lighter and smaller than off-the-shelf cameras. Various implementations disclosed herein may provide a simple electronics design for an ultralow-cost gaze tracker with accuracy and sampling rates that match existing gaze tracking devices, taking up less volume, consuming less power, and having lower mass than an alternative using single or multiple cameras. Several such implementations are related to a head mounted display that takes advantage of an LED's bidirectional characteristics to allow both light capture and illumination, while other implementations are related to use of LEDs in conjunction with photodiodes for the same purpose.

Photosensor elements also offer an advantage in power consumption over camera-based solutions. The resulting heat dissipation issues caused by cameras may also be avoided with use of a low-power photosensor system. Additionally, a gaze estimation pipeline may be designed that is computationally light-weight and effective for use in battery operated applications. Because only a small number of photosensor elements—LEDs or photodiodes, for example—may be utilized in lieu of a camera (having millions of sensing pixels), latency within the hardware and software may also be reduced and results achieved at substantially higher sensing rates. The higher sensing rates may be leveraged for greater accuracy using existing/comparable computational resources. For certain implementations disclosed herein, mean angular error may be as low as 1.1° with a median angular error of 0.7°.

In the context of an HMD system, an array of LEDs may be positioned in front of a subject's eyes for the task of gaze estimation. The LEDs may be used to illuminate the eye and capture light. Light emitting diodes with infrared light emission may be used advantageously in HMD gaze tracker hardware because humans are insensitive to infrared illumination (and thus will be unaware of the gaze tracking when it is taking place) and a human eye's cornea has similar absorption and reflection characteristics in the near infrared as compared to visible light. Additionally, infrared light emitting diodes have a narrow bandwidth (typically about 50 nm) and thus are able to largely avoid cross-talk with other wavelengths.

In operation, as a human subject observes a scene projected at a fixed virtual plane, the subject's eye(s) may be illuminated with infrared light from different perspectives in a time multiplexed fashion. While the intensity of the emitted infrared light may be constant, the intensities of infrared light reflecting off the eye from different perspectives will differ and may be captured and digitized at a high refresh rate. Furthermore, supervised adaptive pattern recognition implementation as part of a calibration process may be used to accurately estimate the subsequent gaze locations of the human subject at the virtual image plane.

Figure 6:
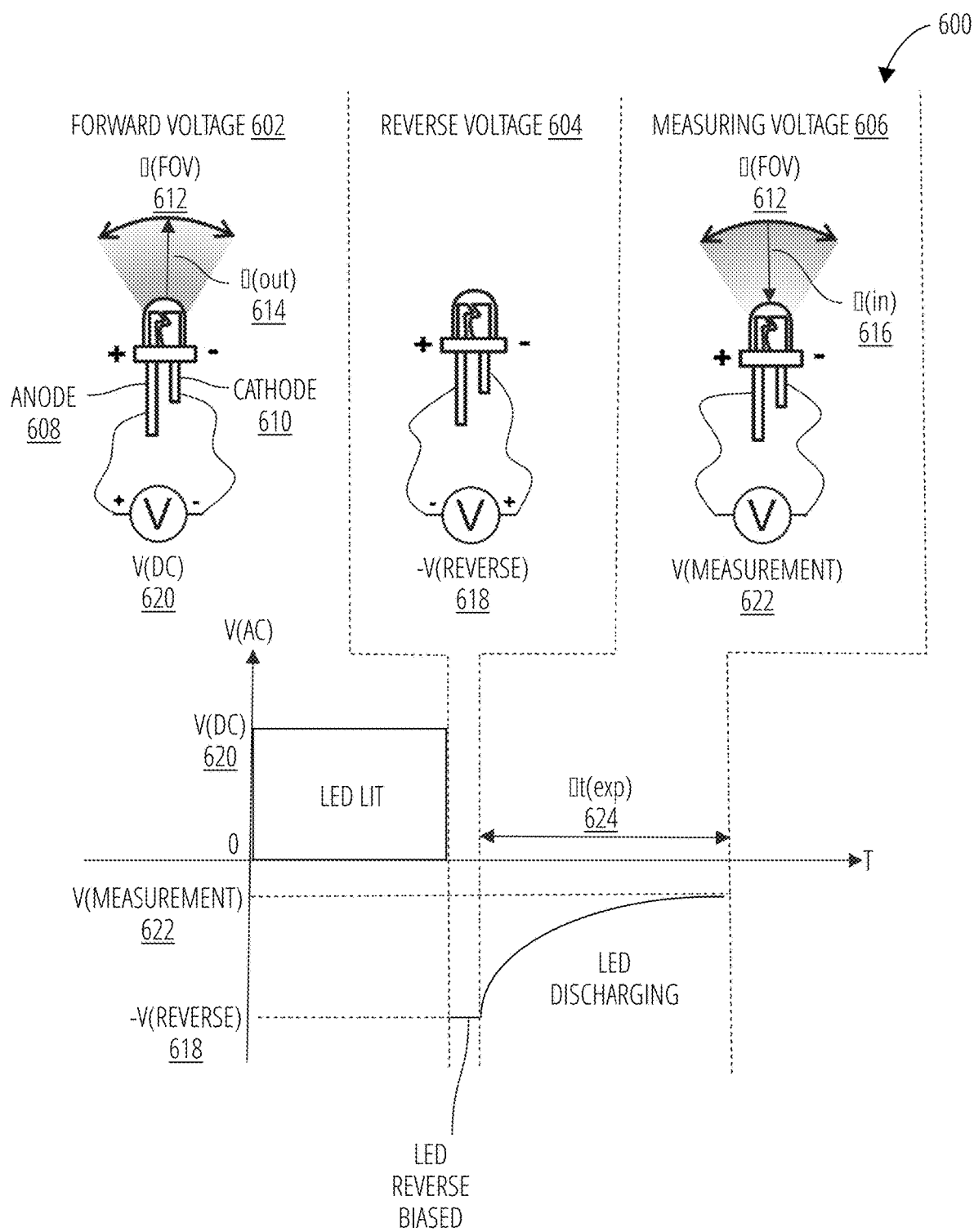
FIG. 6 illustrates an exemplary light emitting diode operational modes 600 representative of various implementations disclosed herein.

Not only can LEDs provide illumination when a forward voltage is applied to their two electrical terminals, but they may also act as photodetectors (akin to a photodiode) by way of a three-step process: (1) apply a reverse voltage pulse for a short time duration; (2) wait while the LED's capacitance is discharged; and (3) measure the voltage across the two terminals of the light emitting diode to determine how much light is detected (e.g., how much infrared light is reflected off of an eye). FIG. 6 illustrates each of the steps and is discussed in more detail later herein. These steps may be implemented by wiring the LED to a microcontroller for full control over charge, discharge, wait, and measure. The microcontroller may be controlled by and relay measurements to a host logic.

Typically LEDs are most sensitive to wavelengths $\lambda(in)$ that are shorter than their emission spectrum, i.e., $\lambda(in)<\lambda(out)$ and, as such, larger exposure times (compared to photodiodes) may be needed if LEDs with the same emission spectrum are used. Minimizing exposure time is important for eye safety, however, and the exposure interval $\Delta t(exp)$ and maximum irradiance of a light emitting diode may be considered in accordance with safety regulations for infrared light sources. Accordingly, to achieve lower latency within a given configuration, LEDs or photodiodes with intersecting emission and sensitivity spectra in the infrared range may be used to minimize exposure times.

Figure 8:
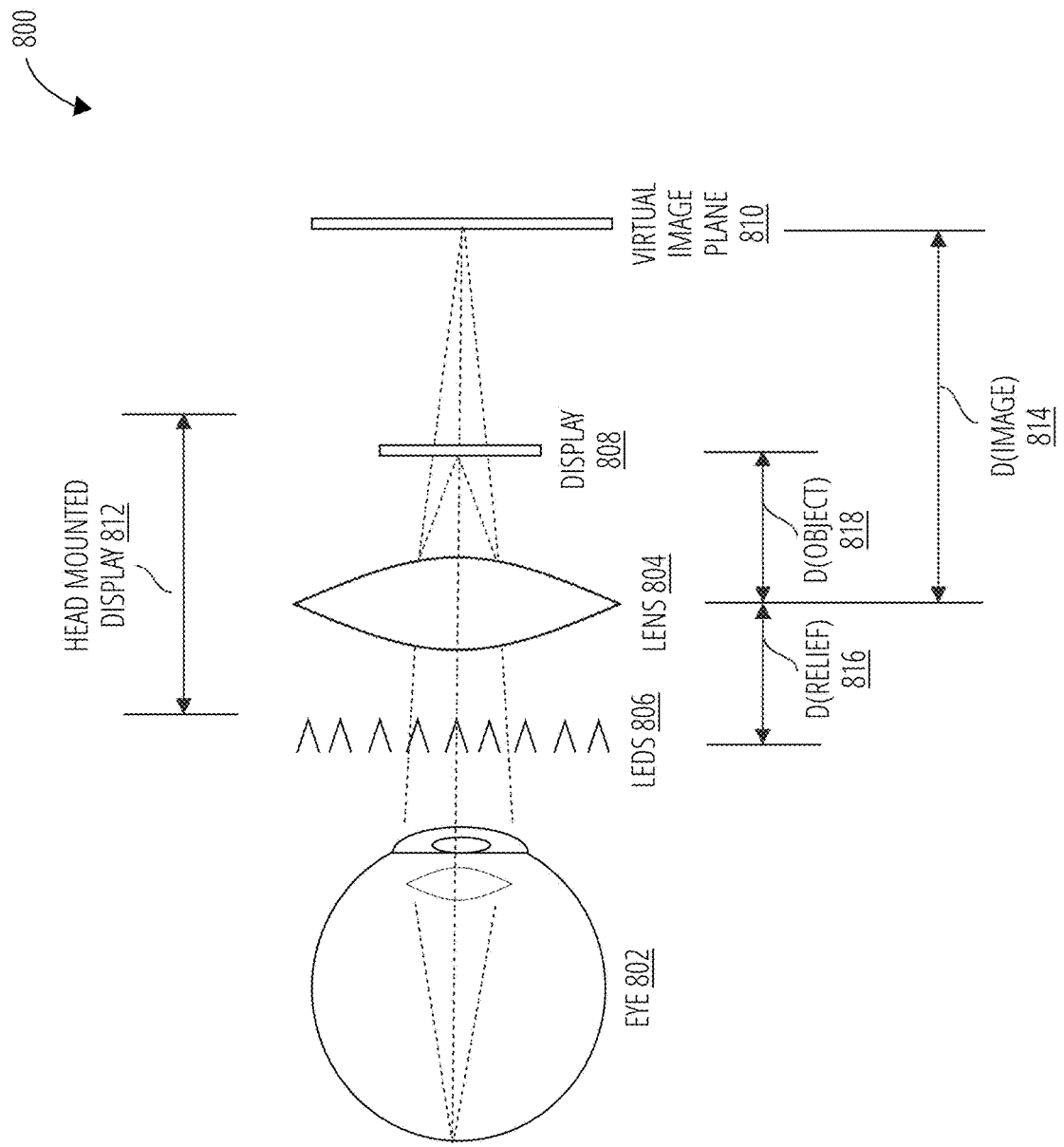
FIG. 8 illustrates an exemplary optical path configuration 800 representative of various implementations disclosed herein.

For both capture and illumination, LEDs and/or photodiodes may be placed at specific locations in front of an eye (or the optical path may be relayed for the same effect). One configuration for an HMD, as shown in FIG. 8, may use a pair of magnifier lenses placed in front of a display to create a virtual image perceived by the user to be at some distance in front of a user. Such a head mounted display setting may include an eye relief distance d(relief) from the eye of 25-30 mm, and an additional spacing d(object) of 35-50 mm between the magnifier lens and display, as determined by the focal length of the magnifier lens.

In various implementations, LEDs may be placed between the lens and the eye or between the magnifier lens and the display. For certain implementations, the LEDs may be placed directly in front of the user's eyes to minimize light loss due to scattering off the other optical elements of the head mounted display. However, LEDs positioned on-axis in front of an eye may occlude parts of the image, whereas placing LEDs in an off-axis arrangement may avoid such occlusions.

A maximal amount of corneal and pupil reflection may be achieved when the photosensor elements (LEDs, photodiodes, or photoresistors) are positioned in proximity to the illuminating LEDs. For some implementations, LEDs may be placed side-by-side in a ring around the magnifier lens. For other implementations, such as the one illustrated in FIG. 9, the LEDs may be arranged in groups comprising two photosensors with one illuminating LED.

A supervised adaptive pattern recognition algorithm (or "calibration") may be used with the sensor technology. This method may have low computational demands and may run sufficiently fast on a conventional mobile platform. Equivalent or better accuracy may be achieved with a much simpler hardware, compared to the most common methods from the literature. Gaze tracking devices for head mounted displays may estimate where a user is gazing relative to a virtual image plane as seen through the head mounted display's lenses. The task of gaze estimation is a layered problem that may require the integration of sensors, optical design, image/signal processing, and electronics design.

Figure 10:
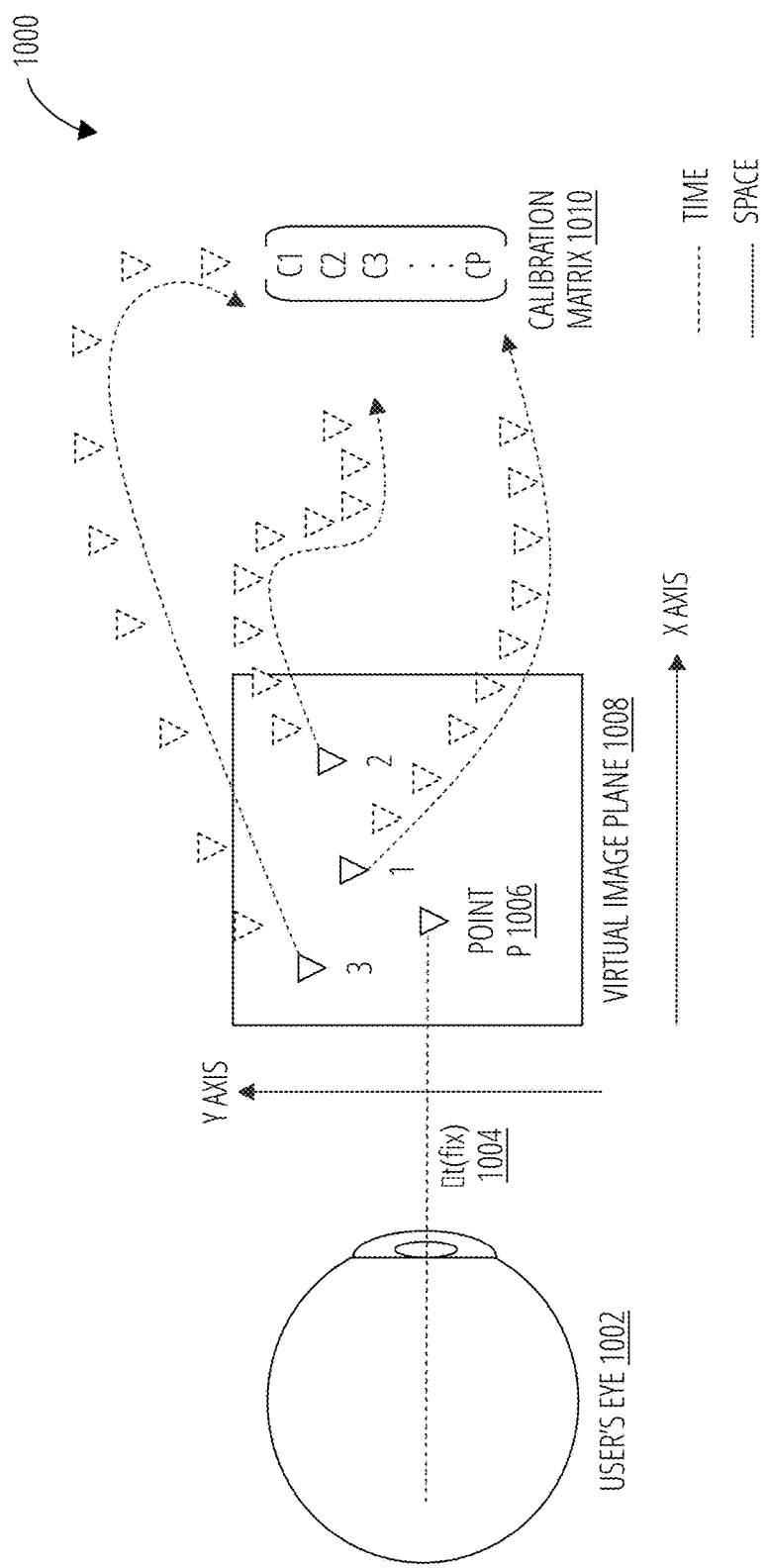
FIG. 10 illustrates a calibration matrix construction process 1000 representative of various implementations disclosed herein.

Capture hardware may host a fixed number M of photosensors. The capture hardware may transmit a data capture vector to the host (PC, smartphones, etc.). This vector may contain measured data as:

$$s(t)=[s_0(t),s_1(t),\ldots,s_M(t)] \qquad \text{Equation 1}$$

where each $s_m(t)$ represents the output of the m-th photosensor connected to the capture hardware. A calibration matrix may be constructed that represents the relation between a captured vector and the gaze locations as follows. First, pre-defined locations may be highlighted on the virtual image plane in random order, and users may be asked to dwell on each of the highlighted locations for a certain duration Δt(fix). During this time, s may be sampled multiple times at fixed intervals Δt(v), and the mean of the measurements may be stored as $c_p = \Sigma_t\, s(t)$ for each pre-defined location p. To ensure a meaningful calibration, the variance of all the measurements for a location p may be confirmed as being below a certain threshold. Otherwise measurements for that location may be discarded. FIG. 10 summarizes the procedure for creation of a calibration matrix.

The pre-defined calibration points may be at any location. For one embodiment, a grid of 2×2 to 5×5 evenly spaced locations may be used. Starting from this small number of calibration points, the gaze location may need to be derived given a set of new measurements s(t). At a later stage, calibration data may be enlarged online through a gaming application, in which a user's task is to gaze and destroy opponents. Using collected data, two different regression methods may be evaluated: Support Vector regression and Gaussian Process regression.

Support Vector regression has a generalized form as:

$$\begin{bmatrix} e_x \\ e_y \end{bmatrix} = k^T \begin{bmatrix} u_x \\ u_y \end{bmatrix}^T \qquad \text{Equation 2}$$

where $e_x$ and $e_y$ represent estimated gaze position along x and y, kT represents a vector that contains the similarity measures between the captured s(t), and the calibration vectors $c_p$. Finally, $u_x$ and $u_y$ represent vectors that correspond to the x and y position of each $c_p$. A regression technique may depend on a distance measure that indicates how similar the captured data is to the stored calibration data. Such a comparison using any method may provide a similarity vector as in:

$$k = \begin{bmatrix} \kappa(s(t), c_1) \\ \vdots \\ \kappa(s(t), c_P) \end{bmatrix} \qquad \text{Equation 3}$$

where κ(a,b) donates the used distance function to determine similarity in between vector a and b, k represents the distance vector. Distance measure for Support Vector regression calculations may be the radial basis function.

Gaussian Process regression may be used in one embodiment as a robust and accurate regression method. Gaussian Process regression may take the following general form:

$$\begin{bmatrix} e_x \\ e_y \end{bmatrix} = k^T C^{-1} \begin{bmatrix} u_x \\ u_y \end{bmatrix}^T \qquad \text{Equation 4}$$

with variables as described above. The covariance matrix C may be calculated as:

$$C = \begin{bmatrix} \kappa(c_0, c_0) & \cdots & \kappa(c_0, c_p) \\ \vdots & & \\ \kappa(c_p, c_0) & \cdots & \kappa(c_p, c_p) \end{bmatrix} \qquad \text{Equation 5}$$

Comparing a vector with another vector may be accomplished in multiple ways. Minkowski distance measure may be used effectively with the Gaussian Process regression algorithm:

$$\kappa(a, b) = \left( \sum_{i=1}^{n} w_i |a_i - b_i|^m \right)^{1/m} \qquad \text{Equation 6}$$

where a and b are two vectors to be compared, $w_i$ is the weighting factor for a certain channel in the captured data, m is the degree of the norm, and i is the index of the element. Good results may be achieved using m=2 and setting $w_i$=1.

For the Support Vector regression algorithm, a radial basis function kernel may be employed:

$$\kappa(a, b) = e^{-\frac{\|a-b\|}{2\sigma^2}} \qquad \text{Equation 7}$$

in which a represents a free parameter. A grid-search may be used to find the optimal σ.

Some embodiments may utilize an artificial neural network for calibration. The neural network inputs sensor value(s) and outputs a predicted gaze direction (in two dimensions, for example). A neural network for calibration may utilize anywhere from 2-6 layers, for example. As an alternative to Gaussian Process regression, Support Vector regression, or an artificial neural network, a random forest regression algorithm may be utilized in some embodiments.

Off-the-shelf head mounted displays may be transformed into gaze sensing head mounted displays. One embodiment may consist of three light emitting and six photosensor elements per eye, a smartphone, a microcontroller (optionally per eye), a controller, and a virtual reality head mounted display as a housing. The gaze tracking algorithm may run on a smartphone in synchronism with the microcontroller(s), or on the microcontroller(s) themselves, driving the light emitting diodes and sampling the photosensors. A second embodiment may consist of one or more light emitting diodes per eye functioning as both light sensors and light sources, one microcontroller per eye, an HDMI display, a controller, and a virtual reality head mounted display as housing. The gaze tracking algorithm may in some embodiments run on a desktop computer, laptop computer, or tablet device.

An embodiment may use a pair of magnifier lenses in front of a display, as shown in FIG. 8. Considering the magnification of the lens, and the distances between LCD, lenses, and eyes, and the display's pixel density, each pixel may correspond to a visual angle of 0.12°. LEDs may be hooked to the microcontroller(s) and interfaced accordingly. Illuminator LEDs may be attached to digital input/output pins, while sensing LEDs' anodes may be attached to digital IOs, with their cathodes attached to analog-to-digital converter (ADC) pins of the microcontroller. Each time a light emitting diode is requested to sense, it may follow the process illustrated in FIG. 6. Alternatively, purpose-built amplification circuits could buffer/filter other photo sensor inputs before providing them as ADC inputs.

Light emitting diodes may have a soft-coded mechanism that adjusts Δt(exp) on a per light emitting diode basis, so that saturation caused by varying light conditions may be avoided for each light emitting diode. Two identical light emitting diodes may have a limited overlap in their emission-sensing spectra. This may lead to low resolution capture with less sampling frequency when identical light emitting diodes are used. Two light emitting diodes with different optical properties may be dedicated to specific tasks (e.g., light emission vs. sensing) to maintain good resolution, or a configuration may use identical light emitting diodes for illumination and sensing. An illuminator light emitting diode may be turned on shortly before taking a measurement from its pair of neighboring sensing light emitting diodes. All remaining light emitting diodes may be illuminating the scene at the time of a capture from a light emitting diode.

The microcontroller in use may utilize a time multiplexed capture routine, with one capture from a single light emitting diode or other photosensor at a time. However, simultaneous capture from different light emitting diodes may be possible using different microcontrollers each using a discrete analog-to-digital converter for each analog pin or sufficient sample-and-hold circuitry. Thus, the effective sampling rate may increase significantly, and latency may be further reduced. In one embodiment, the microcontroller may work synergistically with the user-interface application using a Universal Serial Bus (USB) connection to handle a number of predefined tasks, such as collecting measurements from each photosensor element, updating the user interface, producing a gaze estimation, and keeping logs related to captured data (e.g., event time stamps).

Kalman filtering may be used to enhance accuracy (but may add latency); visual anchors may also be used. Expanding the subject pool may help in clustering subjects for estimating good initial calibration data for each person. Techniques previously discussed herein may be used in conjunction with backlights of spatial light modulators. This may provide an all-in-one solution for sensing and illumination, similar to bi-directional displays.

Virtual reality users may benefit from wearable facial recognition techniques using photo-reflective sensors or from vital sign monitoring, such as heart-rate and blood oxygenation, which may be estimated remotely using photodiodes. A similar methodology using light emitting diodes or other photosensors may be implemented through simple changes to the apparatus described herein. Methodologies described herein may improve in accuracy by considering effects of facial changes due to mood, respiration or heart-rate. Saccadic reaction times are well explored by the medical community as a basis for health condition prediction techniques. An embodiment of the apparatus disclosed herein may be trained to detect saccadic reaction times. While providing sufficient accuracy for a variety of virtual reality applications, due to their poor sensing characteristics compared to photodiodes, light emitting diodes may not be a suitable choice for applications requiring very high accuracy (error <0.5°), such as in psychological, neurological, and reading research.

Blinks and head movements captured using infrared, accelerometer, and gyroscope sensors in a head mounted display may be used for the task of user identification. Such sensors may be incorporated into an embodiment to incorporate user identification into the disclosed apparatus.

The system of this disclosure may require a larger amount of calibration data than conventional imaging-based gaze tracking systems. Thus, the initial phase of calibration may be comparably longer. Conventional head mounted displays may shift slightly on a subject's face, commonly due to fast head movements. In turn, this may cause the sensing hardware to shift relative to the subject's eyes. Using the original calibration data may make gaze estimates less reliable. This problem is common with other gaze trackers. Recalibration in such cases, though burdensome to users, may be used to overcome this issue.

Various implementations disclosed herein are also directed to a system for gaze tracking generally comprising an eyepiece comprising an opaque frame circumferentially enclosing a transparent field of view, a plurality of light emitting diodes (LEDs) coupled to the opaque frame for emitting infrared light onto an eye gazing through the transparent field of view, and a plurality of photodiodes coupled to the opaque frame, each photodiode from among the plurality of photodiodes operationally coupled to a single LED from among the plurality of LEDs for sensing intensity of infrared light reflected off of the eye. Several such implementations may further comprise logic capable of causing the plurality of LEDs to periodically emit infrared light and the plurality of photodiodes to periodically sense infrared light and/or logic for determining a gaze direction of the eye based on the sensed intensity of infrared light reflected by the eye from the plurality of LEDs. Several such implementations may also comprise logic for calibrating the device by determining a gaze direction of the eye to a successive plurality of known points in the field of view based on the sensed intensity of infrared light reflected off of the eye from the plurality of LEDs, and then subsequently determining a gaze direction of the eye based on the sensed intensity of infrared light reflected by the eye from the plurality of LEDs based on the calibration. Certain implementations may also comprise logic for determining that the calibration has become invalid and recalibrating the device by determining a gaze direction of the eye to a successive plurality of known points in the field of view based on the sensed intensity of infrared light reflected off of the eye by the plurality of LEDs. Select implementations may also comprise a camera for periodically sensing infrared light reflected off of the eye along with corresponding logic capable of evaluating the sensing by the plurality of LEDs/photodiodes compared to the sensing by the camera.

FIG. 1 illustrates an exemplary head mounted display device 100 (HMD) representative of various implementations disclosed herein. Two eyepieces 102 are fixedly coupled to a mask 106 for engaging the face of a user. Each of the eyepieces 102 comprises a frame 104 circumferentially defining the boundary of a field of view (FOV) for each eye of the user. Each eyepiece further comprises a plurality of photodiodes 108, specifically eight per eyepiece as shown, as well as a plurality of light emitting diodes 110 (LEDs), specifically three per eyepiece as shown. For certain implementations, the frame 104 may further comprise a pair of cameras 114 that may be oriented to view reflections of the user's eyes via the use of hot mirrors 112 incorporated in the FOV of the frame 104 for each of the eyepieces 102.

Figure 2:
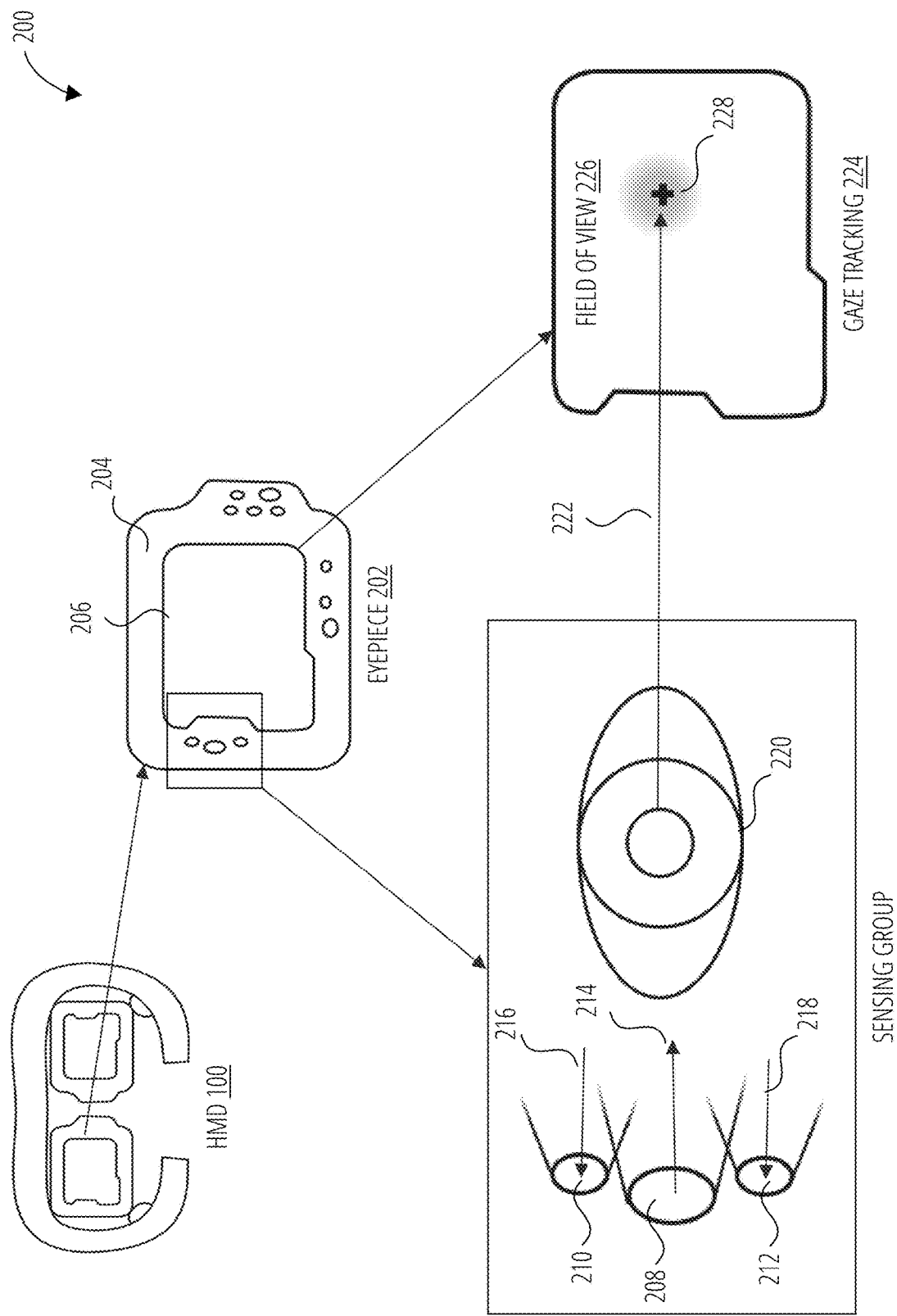
FIG. 2 illustrates an exemplary gaze tracking system 200 representative of various implementations disclosed herein.

FIG. 2 illustrates an exemplary gaze tracking system 200 representative of various implementations disclosed herein. Gaze tracking may be implemented in a head mounted display device 100 by exploiting the capabilities of a sensing group comprising photodiode 212 and photodiode 210 in conjunction with an emitting LED 208, proximal to a magnifier lens 206 of the eyepiece 202 having a defined field of view 226. The LED 208 may direct emitted IR light 214 at the user's eye 220 which is directed along a gaze direction 222 at a gaze target 228 in the field of view 226. The photodiode 210 and photodiode 212 may sense reflected IR light 216 and reflected IR light 218, the intensity of which may be used to perform gaze tracking device 224 calculations.

Other LED and photodiode groupings may also be integrated into the frame to provide different sensing perspectives of different regions of a user's eyes.

For certain implementations, the gaze tracking system 200 may comprise a smartphone, microcontrollers, and a supervised adaptive pattern recognition algorithm to estimate the gaze direction 222 of a user (human subject) in real-time over a smartphone screen viewed through the frame 204.

Figure 3:
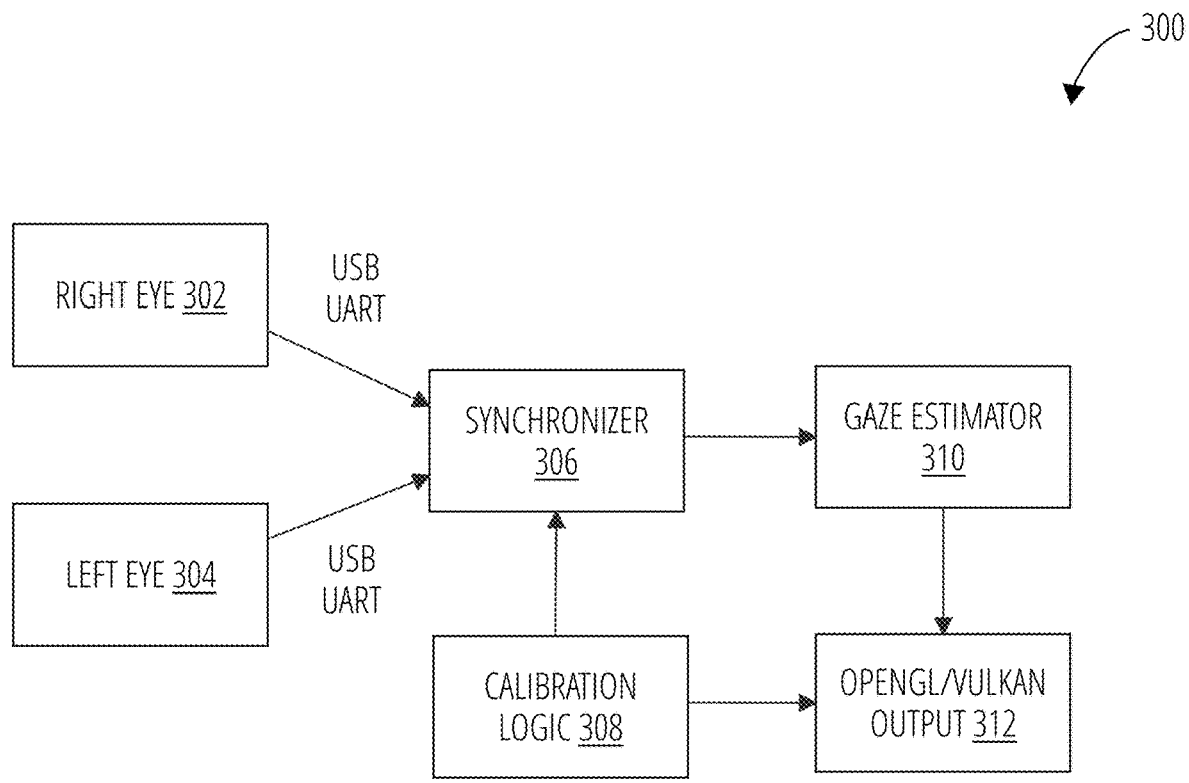
FIG. 3 illustrates an exemplary head mounted display logic 300 representative of various implementations disclosed herein.

FIG. 3 illustrates an exemplary head mounted display logic 300 representative of various implementations disclosed herein. As shown in FIG. 3, gaze data corresponding to the right eye 302 and left eye 304 is received—e.g., via USB UARTs—and applied to a synchronizer 306 using corresponding data provided by calibration logic 308. A gaze estimator 310 operates on the gaze data to produce an output such as OpenGL/Vulkan output 312 as further influenced by the calibration logic 308. The synchronizer 306 may be implemented using known components and techniques that will not be elaborated here.

Figure 4:
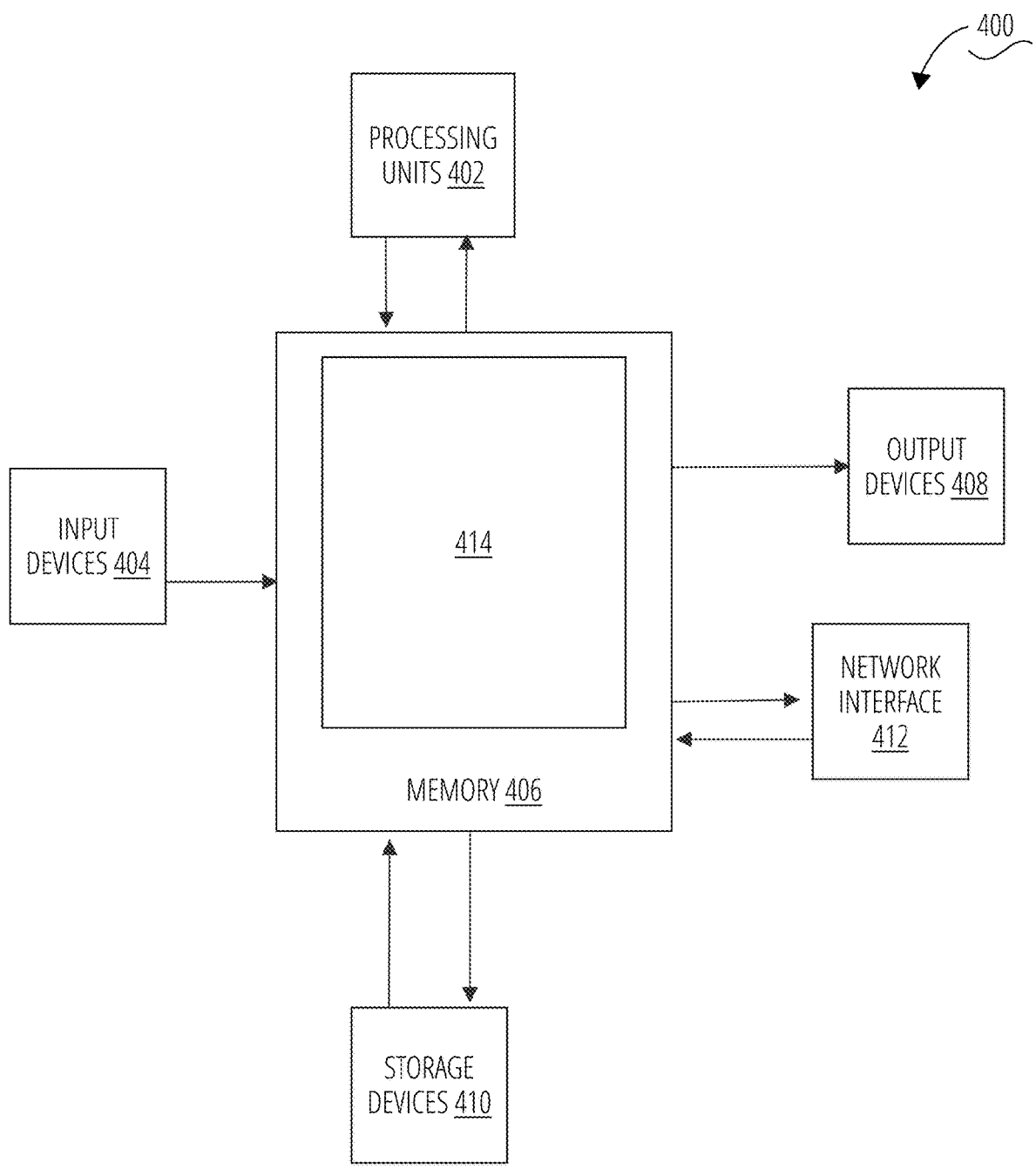
FIG. 4 illustrates an exemplary augmented reality device system logic 400 that may implement aspects of the machine processes representative of various implementations disclosed herein.

FIG. 4 illustrates exemplary augmented reality device system logic 400 that may implement aspects of the machine processes representative of various implementations disclosed herein. The augmented reality device system logic 400 comprises, inter-alia, processing units 402, input devices 404, memory 406, output devices 408, storage devices 410, and a network interface 412. Specifically, the input devices 404 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 404 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 404 are provided via various machine signal conductors (e.g., busses or network interfaces) and circuits to memory 406.

The memory 406 provides for storage (via configuration of matter or states of matter) of signals received from the input devices 404, instructions and information for controlling operation of the processing units 402, and signals from storage devices 410. The memory 406 may in fact comprise multiple memory devices of different types, for example random access memory devices and non-volatile (e.g., FLASH memory) devices. Information stored in the memory 406 is typically directly accessible to the processing units 402 of the device. Signals input to the augmented reality device system logic 400 cause the reconfiguration of the internal material/energy state of the memory 406, creating logic that in essence forms a new machine configuration, influencing the behavior of the augmented reality device system logic 400 by affecting the behavior of the processing units 402 with control signals (instructions) and data provided in conjunction with the control signals. The storage devices 410 may provide a slower but higher capacity machine memory capability. Examples of storage devices 410 are hard disks, optical disks, large capacity flash memories or other non-volatile memory technologies, and magnetic memories.

The processing units 402 may cause the configuration of the memory 406 to be altered by signals in the storage devices 410. In other words, the processing units 402 may cause data and instructions to be read from storage devices 410 in the memory 406 from which may then influence the operations of processing units 402 as instructions and data signals, and from which it may also be provided to the output devices 408. The processing units 402 may alter the content of the memory 406 by signaling to a machine interface of memory 406 to alter the internal configuration, and then converted signals to the storage devices 410 to alter its material internal configuration. In other words, data and instructions may be backed up from memory 406, which is often volatile, to storage devices 410, which are often non-volatile.

The memory 406 and/or storage devices 410 may comprise logic 414 to implement aspects of the machine processes disclosed herein.

Output devices 408 may be transducers which convert signals received from the memory 406 into physical phenomenon such as vibrations in the air, or patterns of light on a machine display, or vibrations (i.e., haptic devices) or patterns of ink or other materials (i.e., printers and 3-D printers). The network interface 412 receives signals from the memory 406 or processing units 402 and converts them into electrical, optical, or wireless signals to other machines, typically via a machine network. The network interface 412 also receives signals from the machine network and converts them into electrical, optical, or wireless signals to the memory 406 or processing units 402.

Figure 5:
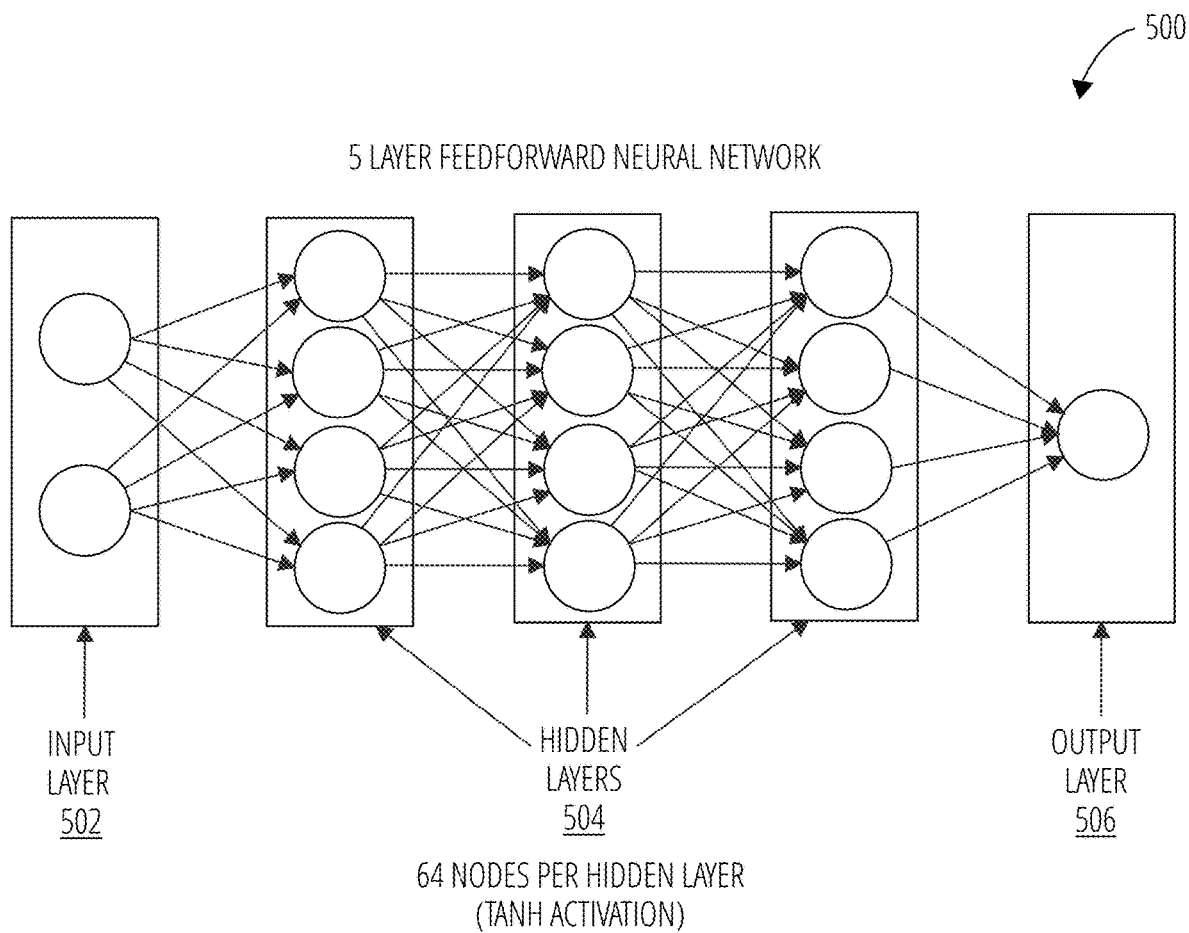
FIG. 5 illustrates an exemplary artificial neural network to implement a gaze estimation algorithm 500 representative of various implementations disclosed herein.

FIG. 5 illustrates an exemplary artificial neural network to implement a gaze estimation algorithm 500 representative of various implementations disclosed herein. An artificial neural network to implement a gaze estimation algorithm 500 is based on a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it. In common implementations, the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals travel from the first layer (the input layer 502), to the last layer (the output layer 506), possibly after traversing one or more intermediate layers, called hidden layers 504.

FIG. 6 illustrates an exemplary light emitting diode operational modes 600 representative of various implementations disclosed herein. Applying a forward voltage 602 of V(DC) 620 between the anode 608 and cathode 610 of the LED causes the LED to emit light with a wavelength of λ(out) 614 across an emission cone angle of Θ(FOV) 612. Applying a reverse voltage 604 pulse, −V(reverse) 618, for a short time duration reverse biases the LED, which will then discharge over a time Δt(exp) 624. Voltage measuring 606 across the LED is carried out as the LED is discharged with incoming light that has a wavelength of λ(in) 616, across a reception cone of angle Θ(FOV) 612, as the V(measurement) 622 voltage can be observed across the LED.

Figure 7:
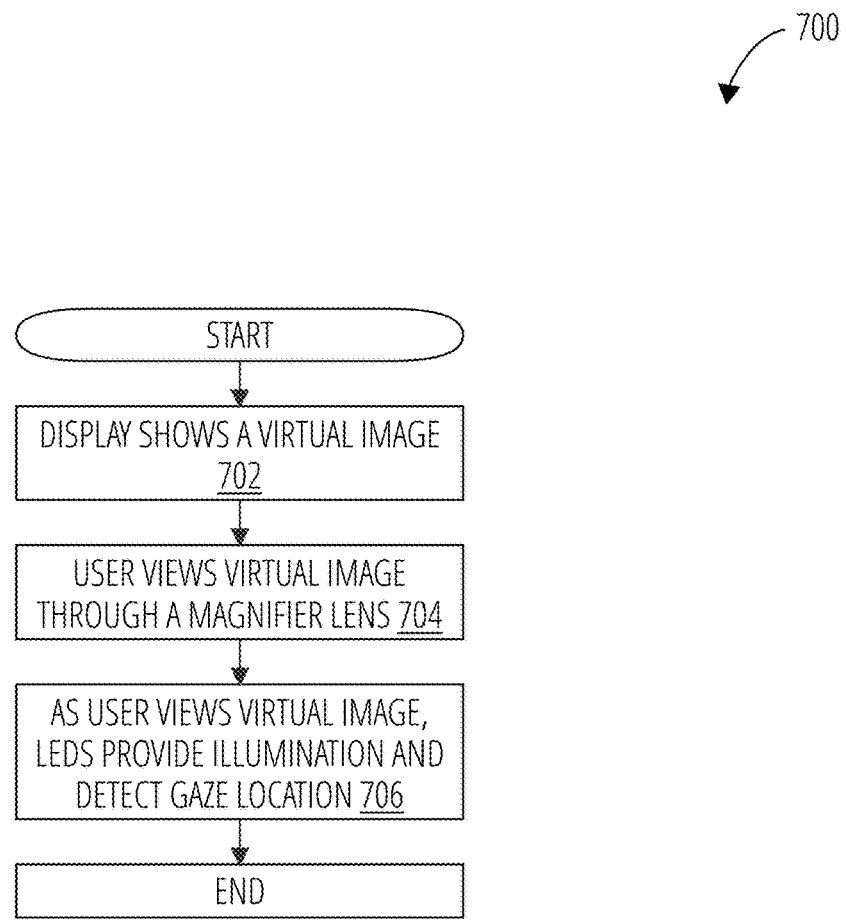
FIG. 7 illustrates an exemplary light emitting diode control process 700 representative of various implementations disclosed herein.

FIG. 7 illustrates an exemplary light emitting diode control process 700 representative of various implementations disclosed herein. The process starts with a display that shows a virtual image (block 702). At block 704 a user views the virtual image through a magnifier lens. As the views the virtual image, at block 706 the LEDs provide illumination and detect (sense) the gaze location (or direction) and continues to do so until the gaze detection ends.

FIG. 8 illustrates an exemplary optical path configuration 800 representative of various implementations disclosed herein. While an eye 802 of a user wearing a head mounted display 812 gazes upon a virtual image plane 810 generated by a display 808 viewed through a lens 804, a plurality of LEDs 806 can be used to estimate the gaze direction of the eye 802 by emitting infrared light onto the eye 802 and then sensing the intensity of the infrared light that is reflected back from the eye 802 to the LEDs 806. The relief distance d(relief) 816 between the LEDs 806 and the lens 804, the object distance d(object) 818 between the lens 804 and the display 808, and the image distance d(image) 814 of the virtual image plane 810 beyond the lens 804 can be varied based on different applications, viewing contexts, and sensing precision.

Various implementations disclosed herein are thus directed to a head mounted display comprising a lens, a display positioned in front of the lens in an optical path, and one or more first light emitting diodes positioned behind the lens in the optical path and adaptively configured in a sensing mode. Several such implementations may further comprise one or more second light emitting diodes positioned behind the lens in the optical path adjacent to the first light emitting diodes and non-adaptively configured in an illumination mode. For some such implementations, each light emitting diode of the first light emitting diodes may be directed to a conic target region different from at least one other conic target region of at least one other light emitting diode from among the first light emitting diodes. For certain implementations, the head mounted display may further comprising logic to, for each light emitting diode of the first light emitting diodes, apply a forward voltage to the light emitting diode for a first duration, apply a reverse voltage pulse to the light emitting diode for a second duration, and measure a voltage between a cathode and an anode of the light emitting diode for a third duration. For select implementations, the light emitting diodes may emit modulated light (e.g., at 24 MHz) and/or emit light having a wavelength between 920 nm and 960 nm (such as, e.g., 940 nm).

Figure 9:
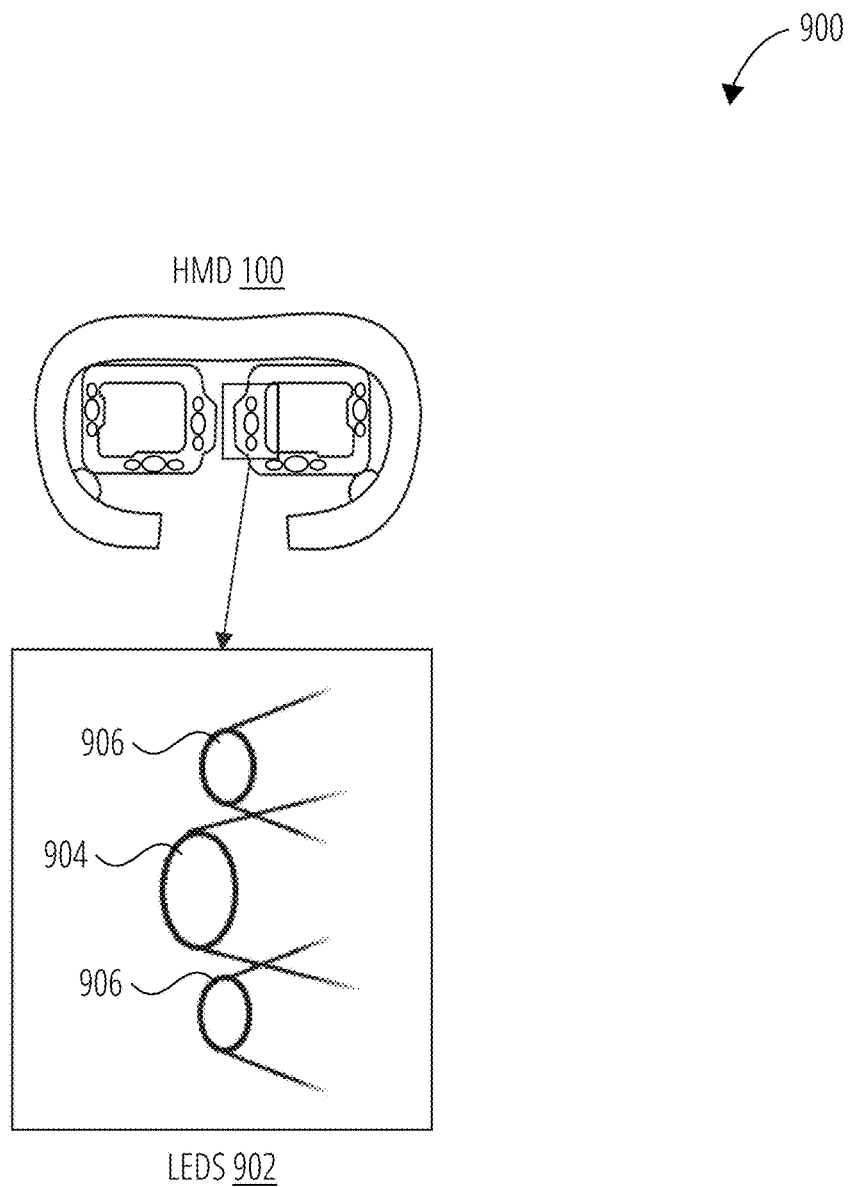
FIG. 9 illustrates an exemplary light emitting diode configuration 900 representative of various implementations disclosed herein.

FIG. 9 illustrates an exemplary light emitting diode configuration 900 representative of various implementations disclosed herein. A head mounted display device 100 utilizes a plurality of LED groups each comprising three LEDs 902. For each LED group, the center LED 904 may be used in illumination source mode and the two outside LEDs 906 may be used in receiver mode to perform gaze detection during both calibration and subsequent operation. For certain implementations, any or all of LEDs 902 may be switched to either mode (as needed or as directed) using the switching techniques described herein.

In view of the foregoing, various implementations disclosed here are also directed to a method for gaze tracking an eye using a gaze tracking device, the method generally comprising (1) determining, using a calibration logic, a set of calibration data corresponding to a first measure of intensities of infrared light reflected by the eye while the eye is gazing at a plurality of calibration points during a first time period, the calibration points corresponding to a plurality of known gaze directions; and (2) comparing, using a gaze tracking logic, an instant gaze direction for the eye during a second time period based on a second measure of intensities of infrared light reflected by the eye to the set of calibration data. For several such implementations, the first measure of intensities of infrared light may further comprise: for each calibration point from among the plurality of calibration points, emitting by a plurality of light emitting diodes a plurality of infrared light cones directed to a plurality of regions of the eye, and sensing by the plurality of light emitting diodes or a plurality of photodiodes a plurality of reflected light for each region from among the plurality of regions of the eye; and/or the second measure of intensities of infrared light further comprises emitting by a plurality of light emitting diodes a plurality of infrared light cones directed to a plurality of regions of the eye, and sensing by the plurality of light emitting diodes or a plurality of photodiodes a plurality of reflected light for each region from among the plurality of regions of the eye. For certain implementations, the calibration points may correspond to a row-and-column arrangement over a field of view wherein the calibration data is arranged as a matrix corresponding to the row-and-column arrangement; the regression analysis may be performed on the calibration data for comparing the instant gaze direction for the eye during a second time period to the set of calibration data; and/or the regression analysis may comprise a Gaussian Process regression.

FIG. 10 illustrates an exemplary calibration matrix construction process 1000 representative of various implementations disclosed herein. A simplified illustration of the calibration matrix construction is shown in which the user's eye 1002 gazes at a certain Point P 1006 on a virtual image plane 1008 for a time period of Δt(fix) 1004. During that time, data is captured and the arithmetic mean value of the capture (CP) is stored at a corresponding row of the calibration matrix 1010.

Figure 11:
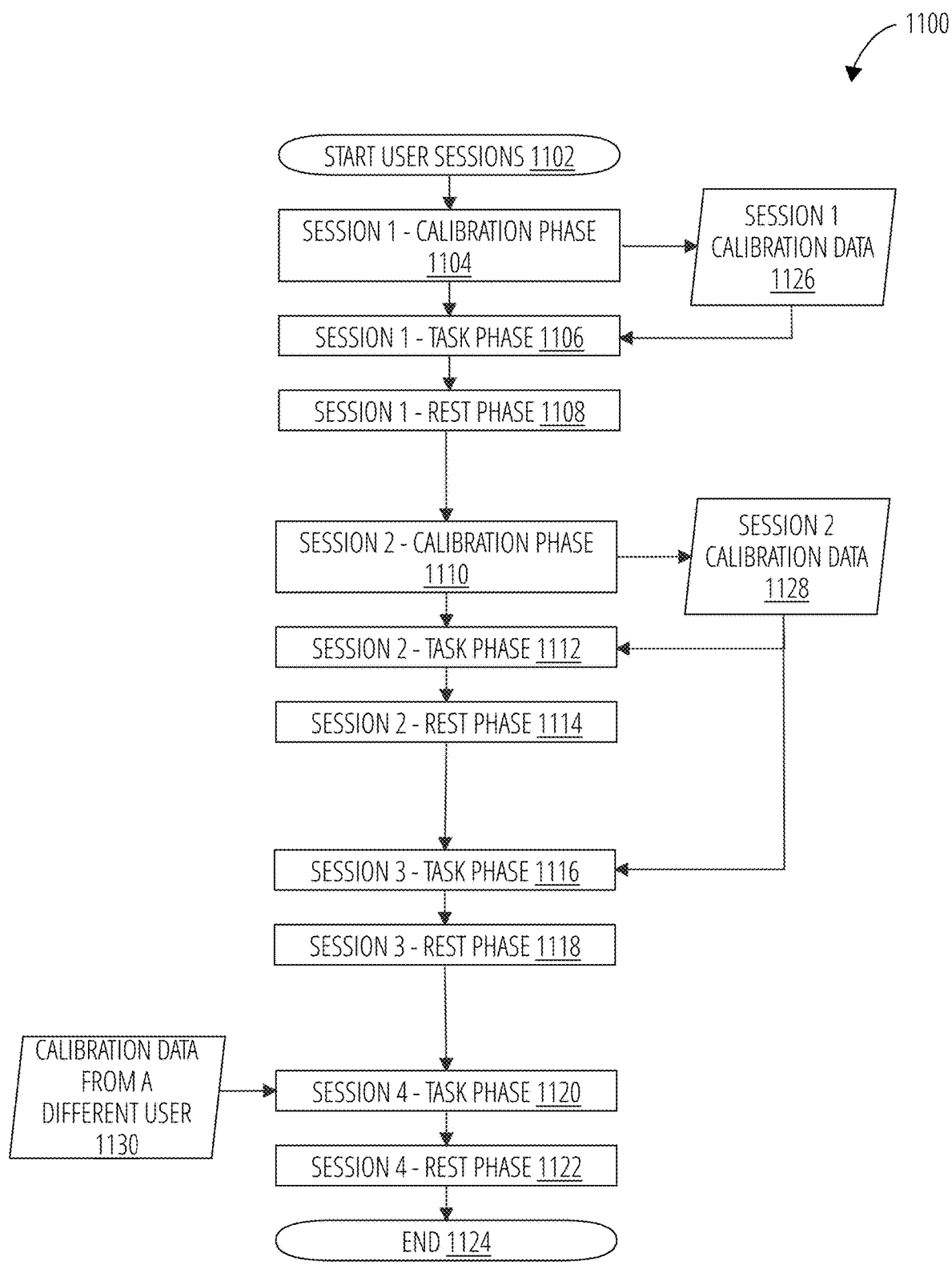
FIG. 11 illustrates an exemplary calibration process 1100 representative of various implementations disclosed herein.

FIG. 11 illustrates an exemplary calibration process 1100 representative of various implementations disclosed herein. The user sessions starts (block 1102) with a session one calibration phase at block 1104 to generate Session 1 calibration data 1126 that is then used during the subsequent first session task phase at block 1106, until progressing to the Session 1 rest phase at block 1108.

The user might temporarily remove the HMD and thereby potentially render the Session 1 calibration data 1126 invalid. With the user again wearing the HMD, a second session calibration phase at block 1110 then commences to generate Session 2 calibration data 1128 that is then used during the subsequent second session task phase at block 1112 until progressing to the session two rest phase at block 1114. If the user does not remove the HMD during this session two rest phase at block 1114—and the session two calibration data is still valid—a third session task phase at block 1116 may then be commenced skipping re-calibration and instead using the Session 2 calibration data 1128 until the session three rest phase at block 1118. During the session three rest phase at block 1118, a new different user may don the HMD, which might otherwise require new re-calibration data. However, if there already exists calibration data from a different user 1130, a fourth session task phase at block 1120 and corresponding rest phase at block 1122 may be commenced using the calibration data from a different user 1130 (in lieu of recalibrating) until the user sessions ends at done block 1124.

The calibration data may be processed for example using the Support Vector regression and/or Gaussian Process regression techniques described previously.

Figure 12:
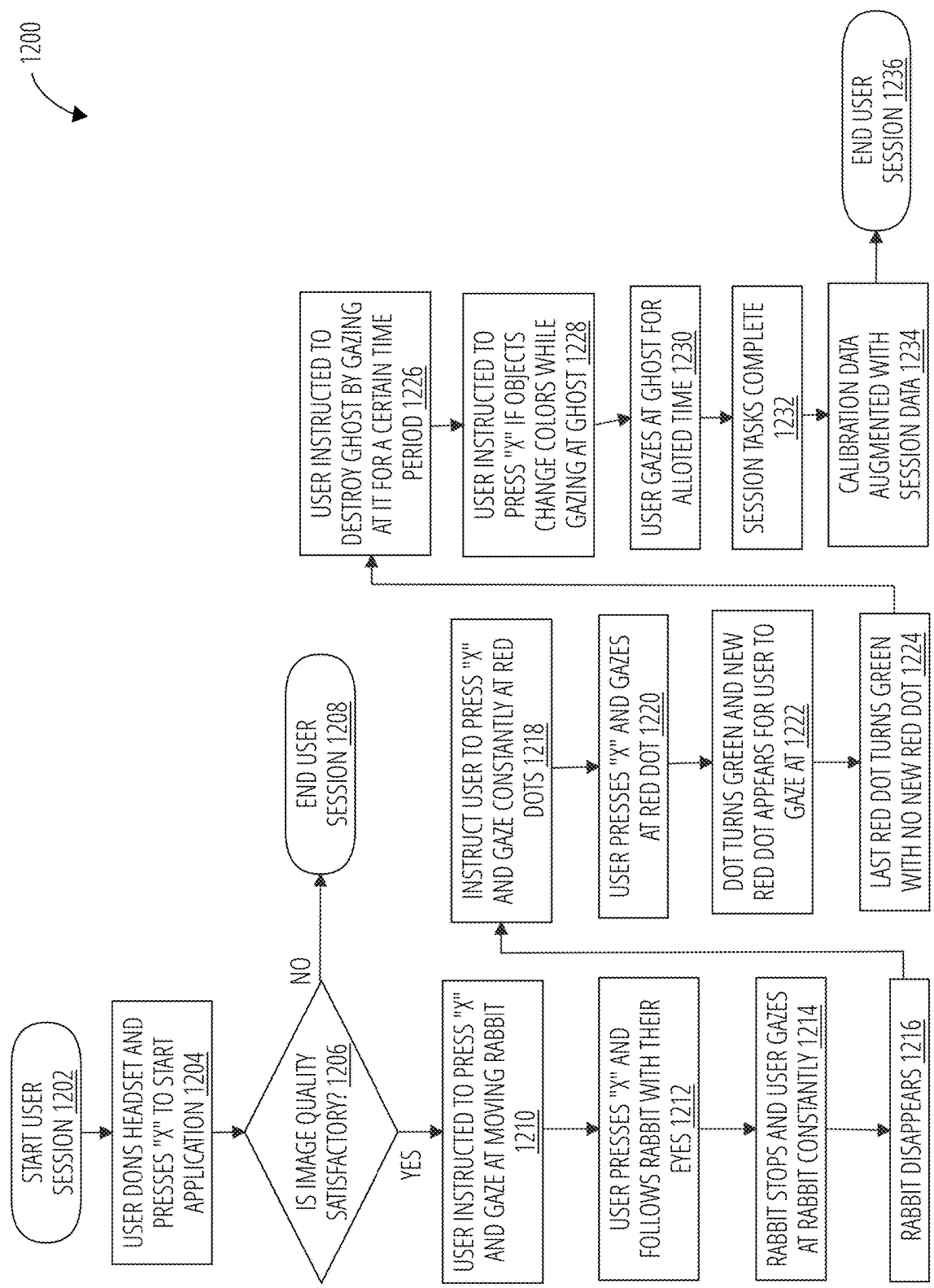
FIG. 12 illustrates an exemplary experimental procedure 1200 representative of various implementations disclosed herein.

FIG. 12 illustrates an exemplary experimental procedure 1200 (or calibration) representative of various implementations disclosed herein. A user session starts at block 1202 with a user donning a headset (block 1204) and pressing "X" (or some other activation control) to start an application operating in conjunction with the headset. At decision block 1206 a determination is then made as to whether the image quality is satisfactory and, if not, the user session ends at done block 1208. Otherwise, at block 1210 the user is instructed to press "X" (or another activation) and gaze at a moving object (e.g., a rabbit) or other target gaze point of known location(s). At block 1212 the user presses "X" (or other activation) and follows the rabbit (or other object) with their eyes. At block 1214, the object stops and the user gazes at the object constantly (that is, continuously) and then, at block 1216, the object disappears. At block 1218 the user is then instructed to press "X" (or another activation) and gaze constantly at a red (or other first color) dot (or other marker), which the user does at block 1220. At block 1222, the marker then turns green (or another color different than the first color) and new red (first color) dot or other marker appears for the user to gaze at. At block 1224 the last red dot (or other marker of the first color) turns green (or other second color) with no new red dot (or other first color marker) displayed and, at block 1226, the user is instructed to destroy an object (e.g., a ghost) by gazing at it for a certain time period. At block 1228, the user is then instructed to press "X" or other activation if the object changes colors while gazing at it. At block 1230, the user gazes at the ghost or other object for an allotted time until, at block 1232, the session tasks are complete and, at block 1234, calibration data is augmented with session data and the session ends at done block 1236.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Moreover, it will be apparent to one skilled in the art that other embodiments may be practiced apart from the specific details disclosed above.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial implementation of the inventions are described or shown for the sake of clarity and understanding. Skilled artisans will further appreciate that block diagrams herein can represent conceptual views of illustrative circuitry embodying the principles of the technology, and that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software. Persons of skill in this art will also appreciate that the development of an actual commercial implementation incorporating aspects of the inventions will require numerous implementation-specific decisions to achieve the developer's ultimate goal for the commercial implementation. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the implementations disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims. For particular implementations described with reference to block diagrams and/or operational illustrations of methods, it should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the implementations disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system. The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

In the foregoing description, for purposes of explanation and non-limitation, specific details are set forth—such as particular nodes, functional entities, techniques, protocols, standards, etc.—in order to provide an understanding of the described technology. In other instances, detailed descriptions of well-known methods, devices, techniques, etc. are omitted so as not to obscure the description with unnecessary detail. All statements reciting principles, aspects, and embodiments, as well as specific examples, are intended to encompass both structural and functional equivalents, and such equivalents include both currently known equivalents as well as equivalents developed in the future, i.e., any elements developed that perform the same function, regardless of structure. While the disclosed implementations have been described with reference to one or more particular implementations, those skilled in the art will recognize that many changes may be made thereto. Therefore, each of the foregoing implementations and obvious variations thereof is contemplated as falling within the spirit and scope of the disclosed implementations, which are set forth in the claims presented below.

What is claimed is:

1. A head mounted display comprising:
   an optical path comprising a lens and a display;
   a plurality of light emitting diodes disposed adjacent to the optical path of the head mounted display;
   a first number of the light emitting diodes configured into an illumination mode toward a gaze location of the head mounted display and a second number of the light emitting diodes configured in a light sensing mode toward the gaze location; and
   logic configured to:
      apply a forward voltage to one or more of the light emitting diodes for a first duration;
      apply a reverse voltage pulse to the one or more of the light emitting diodes for a second duration; and
      measure a voltage between a cathode and an anode of the one or more of the light emitting diodes for a third duration.

2. The head mounted display of claim 1, further comprising at least one central light emitting diode configured non-adaptively in the illumination mode and a plurality of light emitting diodes configured adaptively into the sensing mode and positioned adjacent to the at least one central light emitting diode.

3. The head mounted display of claim 1, wherein one or more of the light emitting diodes emits light having a wavelength between 920 nm and 960 nm.

4. The head mounted display of claim 1, wherein one or more of the light emitting diodes emits modulated light.

5. The head mounted display of claim 1, wherein one or more light emitting diode emits light directed to a conic target region different from at least one other conic target region of one or more other light emitting diode.

6. A system for gaze tracking, the system comprising:
   an eyepiece comprising an opaque frame circumferentially enclosing a transparent field of view;
   a plurality of light emitting diodes coupled to the opaque frame for emitting infrared light onto an gaze position through the transparent field of view;
   a plurality of photodiodes coupled to the opaque frame, each photodiode from among the plurality of photodiodes operationally coupled to a light emitting diode from among the plurality of light emitting diodes for sensing intensity of infrared light reflected from the gaze position;
   logic configured to:
      calibrate the system by determining a gaze direction to a successive plurality of known points in the field of view based on the sensed intensity of infrared light reflected from the gaze position;
      subsequently determine the gaze direction based on the sensed intensity of reflected infrared light originating from the plurality of light emitting diodes, based on the calibration;
      determine that the calibration has become invalid; and
      recalibrate the system by determining the gaze direction to the successive plurality of known points in the field of view based on the sensed intensity of reflected infrared light from the plurality of light emitting diodes.

7. The system of claim 6, further comprising logic configured to cause the plurality of light emitting diodes to periodically emit infrared light and the plurality of photodiodes to periodically sense infrared light.

8. The system of claim 7, further comprising:
   a camera configured to periodically sensing infrared light reflected from the gaze position; and
   logic configured to evaluate the sensing by the plurality of light emitting diodes compared to the sensing by the camera.

9. The system of claim 6, further comprising logic configured to determine a gaze direction based on the sensed intensity of infrared light reflected from the gaze position.

10. A method for gaze tracking by a gaze tracking device, the method comprising:
    determining, using a calibration logic, a set of calibration data corresponding to a first measure of intensities of infrared light reflected from an eye while the eye is gazing at a plurality of calibration points during a first time period, the calibration points corresponding to a plurality of known gaze directions;
    comparing to the calibration data, using a gaze tracking logic, an instant gaze direction for the eye during a second time period based on a second measure of intensities of infrared light reflected by the eye; and
    performing regression analysis on the calibration data to compare the instant gaze direction for the eye during a second time period to the set of calibration data.

11. The method of claim 10, wherein the first measure of intensities of infrared light further comprises, for each calibration point from among the plurality of calibration points:
    emitting, by a plurality of light emitting diodes, a plurality of infrared light cones directed to a plurality of regions of the eye; and
    sensing, by the plurality of light emitting diodes, a plurality of reflected light for each region from among the plurality of regions of the eye.

12. The method of claim 10, wherein the first measure of intensities of infrared light further comprises, for each calibration point from among the plurality of calibration points:
    emitting, by a plurality of light emitting diodes, a plurality of infrared light cones directed to a plurality of regions of the eye; and
    sensing, by a plurality of photodiodes, a plurality of reflected light for each region from among the plurality of regions of the eye.

13. The method of claim 10, wherein the second measure of intensities of infrared light further comprises:
    emitting, by a plurality of light emitting diodes, a plurality of infrared light cones directed to a plurality of regions of the eye; and
    sensing, by the plurality of light emitting diodes, a plurality of reflected light for each region from among the plurality of regions of the eye.

14. The method of claim 10, wherein the second measure of intensities of infrared light further comprises:
    emitting, by a plurality of light emitting diodes, a plurality of infrared light cones directed to a plurality of regions of the eye; and
    sensing, by a plurality of light emitting diodes, a plurality of reflected light for each region from among the plurality of regions of the eye.

15. The method of claim 10, wherein the calibration points correspond to a row-and-column arrangement over a field of view, and wherein the calibration data is arranged as a matrix corresponding to the row-and-column arrangement.

16. The method of claim 10, wherein the regression analysis comprises a Gaussian Process regression.

\* \* \* \* \*